J. T. Frankeberger's Corn Harrow.

72623

PATENTED
DEC 24 1867

United States Patent Office.

J. T. FRANKEBERGER, OF HENSLY, ILLINOIS.

Letters Patent No. 72,623, dated December 24, 1867.

---

IMPROVEMENT IN HARROWS.

---

The Schedule referred to in these Letters Patent and making part of the same.

---

TO ALL WHOM IT MAY CONCERN:

Be it known that I, J. T. FRANKEBERGER, of Hensly, in the county of Champaign, and State of Illinois, have invented certain new and useful Improvements in Corn-Harrows; and I do hereby declare that the following is a full, clear, and exact description thereof, reference being had to the accompanying drawings, and to the letters of reference marked thereon, which form a part of this specification.

In the annexed drawings, which make a part of this specification—

Figure 1:
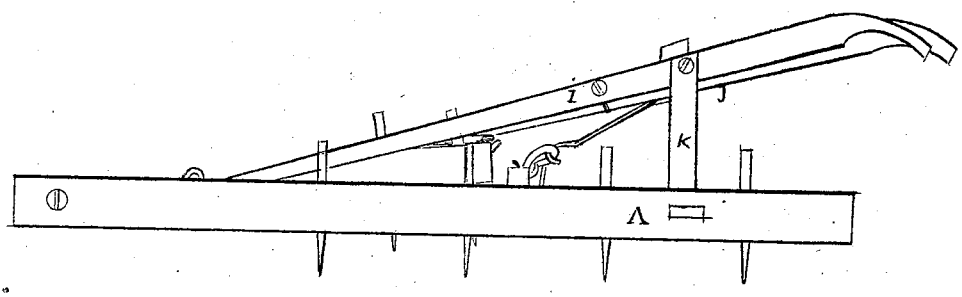
Figure 1 represents a side view of my harrow.
Figure 2:
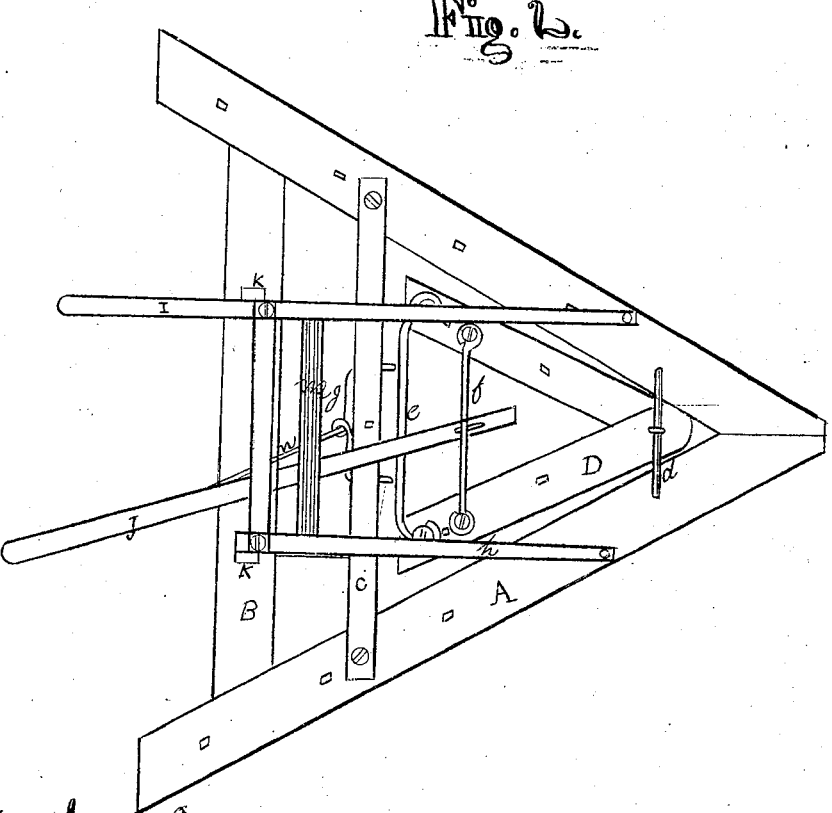
Figure 2 is a plan view of the same.

The letter A represents the main harrow, which is triangular in form. The two sides of A are connected together by the ties B and C. The tie B is mortised into the sides of A, and the tie C is secured to the upper surface of said side pieces by strong bolts. D represents a smaller or supplemental harrow, which is placed within the angle formed by the sides of A, and extends back to within a little distance of tie C. The ends of harrow D are then bound together by the iron rods $e$ and $f$, as shown in fig. 2. The harrow D is hinged, near its apex, to A, as represented in fig. 2, by an iron rod, $d$, which passes through a staple in harrow D, and then driven, at its ends, into the sides of A. $g$ designates a strong iron rod, the ends of which penetrate tie C and curve upwards, to afford a support to the rod $e$. $i$ and $j$ represent the handles of my harrow, the handle $i$ fastened securely to one side of A, and the handle $j$ is hinged to the rod $f$, and is intended to give a lateral motion to harrow D. $k\,k$ represent two uprights, to one of which the left handle of the harrow A is fastened, and the other answering as a support to brace $h$. $m$ designates a bar, which binds brace $h$ and handle $i$ together. In the under surface of bar $m$ a staple is driven, which supports the handle $j$. $n$ represents a rod, hooked at its lower end, and working in loop made by rod $g$. The other end of rod $n$ is fastened to the handle $j$.

In using my invention, the small harrow D will be placed over a row of corn, with two teeth on each side of said row. If the team drawing the harrow should vary to the right or left, the operator, by moving the handle $j$ to the right or left, will throw the harrow D in the opposite direction, and thus keep it in a line with the corn-row. If stubble or trash of any kind should lodge against the teeth of harrow D, it will be disengaged from the teeth by bearing down on handle $j$, and thus raising the rear of the said harrow some distance above the earth.

Having thus described my invention, what I claim, and desire to secure by Letters Patent, is—

The harrow A, the supplemental harrow D, and handle $j$, the whole combined and operating substantially as herein specified.

In testimony that I claim the foregoing as my own, I affix my signature in presence of two witnesses.

J. T. FRANKEBERGER.

Witnesses:
CHANCEY W. FREELOVE,
GEORGE FRANKEBERGER.